United States Patent Office 3,229,503
Patented Jan. 18, 1966

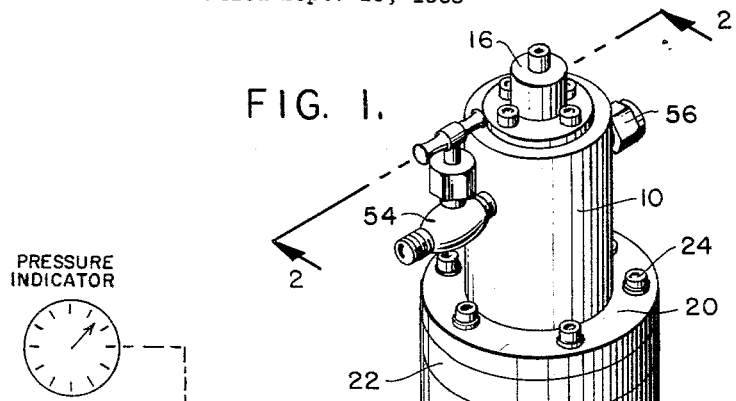
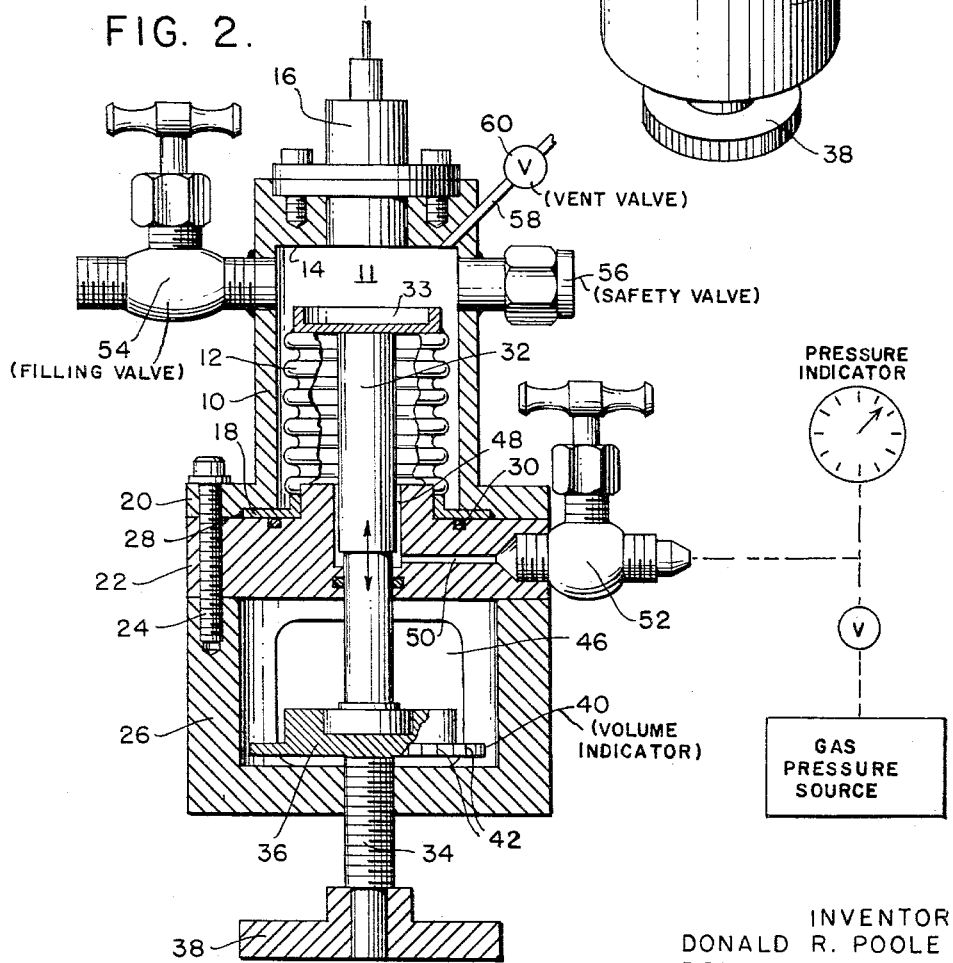

3,229,503
HIGH PRESSURE DENSIMETER
Donald R. Poole and Donald G. Nyberg, China Lake,
Calif., assignors to the United States of America as
represented by the Secretary of the Navy
Filed Sept. 10, 1963, Ser. No. 308,039
2 Claims. (Cl. 73—32)
(Granted under Title 35, U.S. Code (1952), sec. 266)

The invention described herein may be manufactured and used by or for the Government of the United States of America for governmental purposes without the payment of any royalties thereon or therefor.

This invention relates to the art of determining density of liquids and more particularly to improvements in apparatus and method for determining density of certain liquids which are not subject to such determination by conventional apparatus. An example of such conventional apparatus is the glass pycnometer in which a known weight of liquid is disposed within a graduated glass tube and its volume is visually observed. The ratio between the known weight and volume then determines the density of the liquid at the particular temperature of the observation.

In the art of liquid rocket propellants certain of the liquids contain oxidizers, such as fluorides, which are incompatible with glass or plastics, and further, have such high vapor pressures at certain temperatures to render such type of instrument unusable. Since the density of such types of liquids is required for designing the size of propellant tankage, conduits and metering passages, and other considerations, it is apparent that novel techniques and apparatus for determining the density of this class of liquids, which includes cryogenics, has become essential.

One of the objects of this invention, accordingly, is to provide novel apparatus and method of determining the density of liquids which are incompatible with the materials employed by conventional densimeters, which liquids also have high vapor pressures at the temperatures at which the density measurement is to be made.

Other objects are to provide a liquid densimeter which is simple in construction, economical of manufacture, and easily operable and accurate.

Further objects, advantages and salient features will become more apparent from a consideration of the description to follow, the appended claims, and the accompanying drawing in which:

FIG. 1 is an isometric view of the subject of the invention, and

FIG. 2 is a section taken on line 2—2, FIG. 1.

Referring now to the drawing, the invention comprises a stainless steel cylinder 10, closed at opposite ends, and enclosing a volume 11 which may be varied by an expansible stainless steel bellows 12 of conventional construction. One end of the cylinder is closed by a wall 14, to which is affixed a conventional pressure transducer 16, ad the other end is closed by a flange 18 on one end of the bellows which is secured between a flange 20 on the cylinder and a supporting wall 22 by screws 24, which screws also secure a cup-shaped member 26 to the supporting wall 22. To prevent leakage about the periphery of flange 18, a weldment or braze 28 between flange 18 and the cylinder may be employed An O-ring 30 prevents gas leakage around the other surface of flange 18 as will subsequently be described.

Bellows 12 may be increased in length, thus increasing its volume, by a rod 32 having an integral plate 33 on one of its ends which is secured to the bellows by welding or the like. The rod is moved axially upward, as viewed in FIG. 2, by a screw 34, having a cup-shaped thrust member 36 which rotatably engages the lower end of rod 32. A knurled knob 38, affixed to the screw, permits rotation of the screw by the hand of an operator. A dial 40, forming a part of member 36, is provided with graduations 42 cooperating with a suitable fixed index so that the exact length of the bellows may be determined. A window 46 is provided through which the graduations and index may be observed. Alternatively, the axial position of member 36 and hence the position and volume of bellows 12 may be determined by a micrometer if it is desired to omit graduations 42.

An annular channel 48 surrounds rod 32 communicating the inside of the bellows with a conduit 50 through which gas under pressure may be admitted by a valve 52, such as a needle valve. A like valve 54 provides communication to cylinder 10. A burst diaphragm or pre-loaded safety valve 56 is connected to cylinder 10 which is adapted to open if the pressure within the cylinder becomes excessive, thus protecting parts of the device which might otherwise be damaged. A conduit 58, having a valve 60 in same, may be provided for venting air from the cylinder as it is being filled with liquid to thus ensure that when the cylinder is filled with a liquid, only the liquid and its vapor will be present within the cylinder.

In operation, the apparatus is disposed in a controlled temperature bath and the liquid is introduced at low temperature into cylinder 10 through valve 54 until the latter is filled with liquid. Valve 60 may be opened to bleed out any entrapped air during the filling of the cylinder. Also, gas under pressure, such as nitrogen, is applied to the inside of bellows 12, through valve 52, to balance the pressure within the cylinder. When valves 54 and 60 are closed the apparatus is allowed to warm slowly in the controlled temperature bath until the desired temperature is reached, during which time the pressure within the bellows is maintained equal to the pressure within the cylinder. When the desired temperature is reached knob 38 is turned, increasing the volume of the bellows and decreasing volume 11. As long as vapor is present within volume 11 the pressure, as observed by pressure transducer 16, will remain constant. When volume 11 becomes liquid full, however, the pressure will rapidly rise indicating that no vapor is present within cylinder. At this point the position of dial 42 is observed or measured and from previous calibration of the apparatus, the volume of liquid within the cylinder will be known. Its weight may be determined in any conventional manner such as by taking the difference in weight between the apparatus when empty and when filled with the liquid. From the now known weight, temperature and volume of the liquid its density at that particular temperature may be determined by simple calculation.

Obviously many modifications and variations of the present invention are possible in the light of the above teachings. It is therefore to be understood that within the scope of the appended claims the invention may be practiced otherwise than as specifically described.

What is claimed is:
1. A method of determining the density of a liquid having a high vapor pressure comprising the steps of:
  (a) Introducing a known weight of said liquid at relatively low temperature into a variable volume and temperature controlled chamber,
  (b) gradually increasing the temperature of said chamber and liquid to the temperature at which the density of the liquid is to be determined,
  (c) gradually decreasing the volume of said chamber at the desired temperature, thus gradually condensing the vapor contained within the liquid, and simultaneously measuring the substantially constant pressure within the chamber as the vapor is condensing until the substantially constant pressure rapidly increases, at which point all of the vapor is liquified,

(d) measuring the volume of the liquid at the point at which the pressure rapidly increases, and
(e) calculating the density of the liquid at said desired temperature from its measured weight and measured volume at the point of rapid increase in pressure.

2. Apparatus for measuring the density of a liquid having a high vapor pressure, comprising:
   (a) a variable volume temperature controlled chamber into which a known weight of said liquid at relatively low temperature may be introduced and retained,
   (b) means for gradually increasing the temperature of said chamber and liquid to a desired temperature at which the density of the liquid is to be determined,
   (c) means for gradually decreasing the volume of said chamber at the desired temperature, thereby gradually condensing the vapor contained within the liquid,
   (d) means for measuring the substantially constant pressure within the chamber as the vapor is condensing, operative to measure a rapid increase in pressure at the point all of the vapor has condensed, and
   (e) means for measuring the volume of the liquid at the point at which the pressure rapidly increases,
   (f) whereby the density of the liquid at said desired temperature may be calculated from its measured weight and measured volume at the point of rapid increase in pressure,
   (g) said means for decreasing the volume of said chamber comprising an axially extensible bellows forming a wall of same, said bellows adapted to be extended by said means for measuring the volume, and means for pressurizing the inside of said bellows to the same pressure within the chamber.

References Cited by the Examiner
UNITED STATES PATENTS

| | | | |
|---|---|---|---|
| 2,576,747 | 11/1951 | Bryant | 73—262 |
| 3,030,808 | 4/1962 | Herman | 73—262 |
| 3,060,130 | 10/1962 | Sacks | 73—32 |
| 3,060,724 | 10/1962 | Smith | 73—32 |
| 3,129,585 | 4/1964 | Hamilton | 73—32 X |

FOREIGN PATENTS

| | | |
|---|---|---|
| 1,073,213 | 1/1960 | Germany. |

LOUIS R. PRINCE, *Primary Examiner.*

RICHARD QUEISSER, *Examiner.*

DAVID B. DEIOMA, MICHAEL B. HEPPS,
*Assistant Examiners.*